Sept. 21, 1954  R. S. FEIGAL  2,689,479
HUMIDITY MEASURING APPARATUS
Filed Nov. 28, 1950
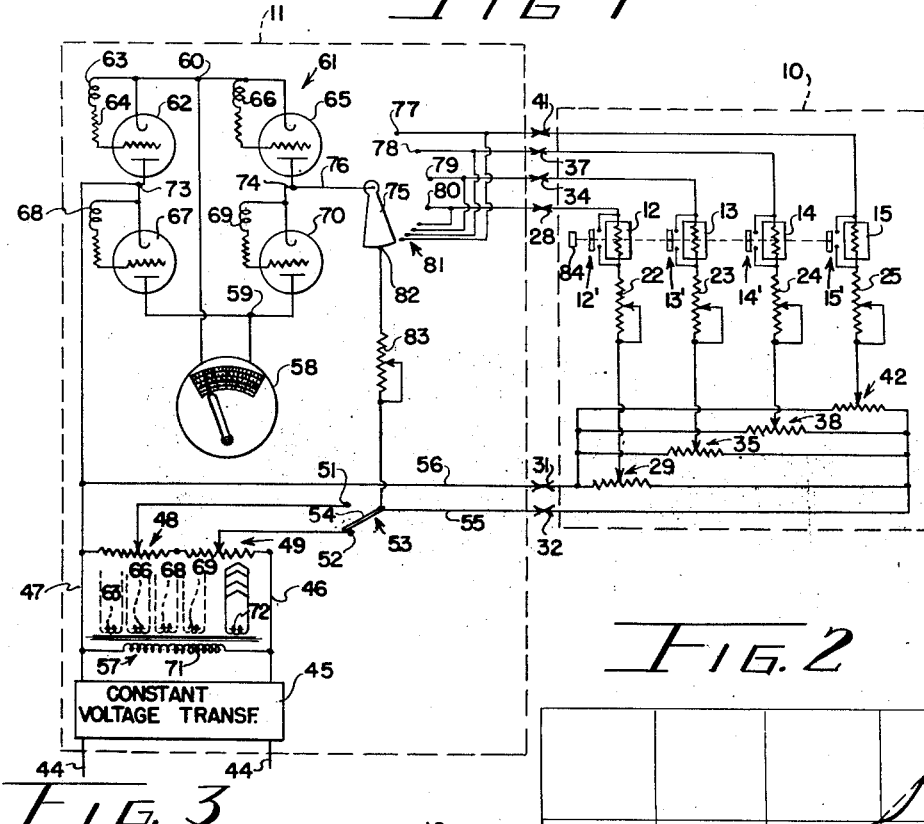
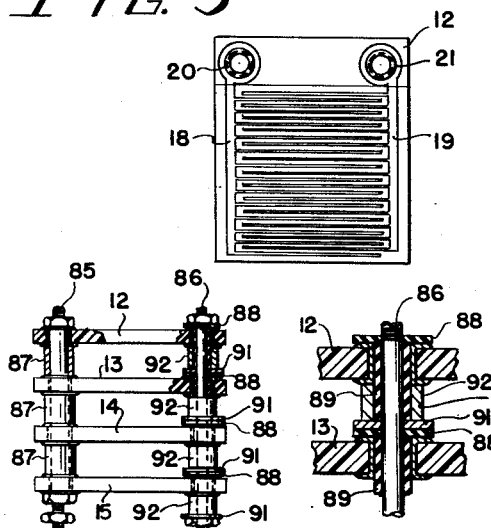
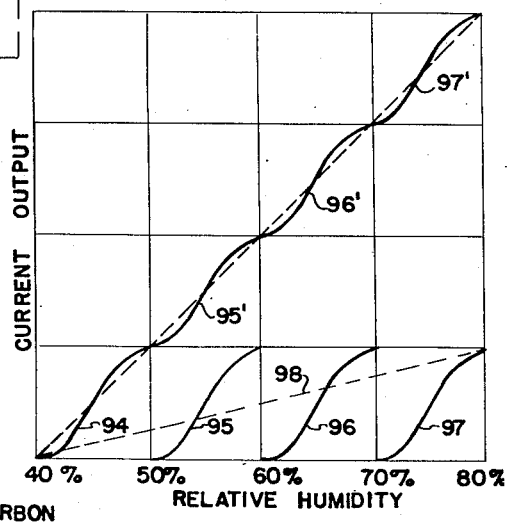
INVENTOR.
RICHARD S. FEIGAL
BY George H Fisher
ATTORNEY Patented Sept. 21, 1954

2,689,479

UNITED STATES PATENT OFFICE 2,689,479

HUMIDITY MEASURING APPARATUS

Richard S. Feigal, Minneapolis, Minn., assignor to Minneapolis-Honeywell Regulator Company, Minneapolis, Minn., a corporation of Delaware Application November 28, 1950, Serial No. 198,000

12 Claims. (Cl. 73—335)

The present invention relates to improved apparatus for determining relative humidity.

Resistance elements responsive to relative humidity are now commercially available and, while they perform well, each element is most efficient over a relatively small range of relative humidity. Further, although a circuit for connecting a plurality of these elements together so that they can cover an extended range is known, it is difficult to calculate and set up, hence it is an important object of this invention to provide an improved plural element circuit for relative humidity elements.

Because there tends to be some loss in sensitivity in an extended range circuit, it is a further object to provide a convenient arrangement wherein a plurality of elements may be connected together or may be individually used in the circuit.

It is an additional object to provide an output circuit for elements of the present sort in which an improved rectifier circuit operates to minimize residual signals and thereby permits increased accuracy of the high impedance sensing circuit.

It is also an object to provide a simplified assembly of a plurality of condition responsive resistors and fixed resistors usable in circuits such as herein described.

As a further object, a circuit is provided which is especially useful for relative humidity measurement of plug-in sample boxes.

These and other objects will be apparent upon a study of the following specification and drawings wherein:

Figure 1 is a schematic wiring diagram of the present apparatus.

Figure 2 is a diagram showing the effect of connecting the relative humidity responsive resistors in the present circuit.

Figure 3 is an elevation view of a relative humidity responsive resistor.

Figure 4 shows a modified assembly of a plurality of humidity responsive resistors and fixed resistors.

Figure 5 is an enlarged view of a portion of the apparatus of Figure 4.

Figure 1 schematically shows an adaptation of the present invention wherein 10 represents an enclosed space, a sample box, or the like, wherein an indication of the relative humidity in the space or box is desired. Box 10 is electrically connected by detachable connectors with an indicator box or panel 11, a complete system being available only when box 10 is plugged into box 11. Obviously, in the event that 10 represents a space rather than a sample box, device 11 may be permanently connected to the apparatus shown in 10 and may either be in the space 10 or remotely located.

The sensing elements 12, 13, 14 and 15 are preferably similar to element 12 shown in Figure 3 and each comprises a pair of spaced conductors 18 and 19 covered by a hydroscopic coating which varies in resistance depending on the relative humidity to which it is exposed, these elements being essentially the same as those described in Squier application, Serial No. 17,622, filed March 27, 1948, now Patent No. 2,543,384. While each of these elements is, in appearance, the same, the concentration of salt in the coating of each of the elements differs somewhat, this being the preferred method of changing the range of operation of the elements. Electrical connections are made to spaced conductors 18 and 19 by eyelet connectors 20 and 21, respectively. As now obtainable, these elements have a high impedance, in the nature of about 300,000 ohms when responding to a relative humidity in about the middle of the control range for the particular element. However, although the elements have a relatively high resistance in the operating range, their resistance changes appreciably with changes in humidity and drops to a relatively low value when subjected to humidities above the normal range and rises very high under drier air conditions. For this reason, it is preferred that a fixed resistor be in series with each RH element to protect it from damage under high humidity conditions, and it has been found that advantages result if this fixed resistor has substantially the same resistance value as the RH element at about the midpoint of its desired range. Thus, resistors 22, 23, 24 and 25, connected in series with RH elements 12, 13, 14 and 15, respectively, have substantially the same resistance values as their respective RH elements, about 300,000 ohms each. These resistors are shown as adjustable but it should be kept in mind that they are made adjustable only as a matter of convenience for if the calibration of the RH elements and the resistors are held to very close tolerances and the resistors are accurately matched with their RH elements, no adjustments are necessary. However, because of the difficulty of making the elements to the very close tolerances sometimes desired, it has been found more convenient to make these resistors adjustable. In addition, because it is desired to connect the pairs of matched impedances in parallel across a source of current, it is often desirable to make the voltages applied to each of the pairs or sets of impedances adjustable to some extent so that they can be more accurately related to each other. Thus, the upper end of element 12 is connected to detachable connector 28 and the lower end is connected to resistor 22 which in turn is connected to the wiper of potentiometer 29, the resistor of this potentiometer being connected across conductors attached to detachable connectors 31 and 32; the upper end of element 13 is connected to detachable connector 34 while its lower end is attached to resistor 23 which in turn is connected to the wiper of potentiometer 35, the resistor of potentiometer 35 being connected in parallel with the resistor of potentiometer 29. Likewise, the upper end of element 14 is connected to detachable connector 37 and the lower connection is attached to resistor 24 which in turn is connected to the wiper of potentiometer 38, the resistor of this potentiometer being connected in parallel with the resistors of the previously mentioned potentiometers, and the upper end of element 15 is connected to detachable connector 41 while the lower end of the element is attached to resistor 25 which in turn is connected to the wiper of potentiometer 42, the resistor of this potentiometer also being connected in parallel with the aforementioned potentiometer resistors. For calibration purposes, switch controlled shunt circuits 12', 13', 14' and 15' are arranged around elements 12, 13, 14 and 15, respectively, the switches of these circuits being preferably arranged for simultaneous operation by a push button 84. Obviously, temporary shunt connections or any other convenient switching arrangement may be used if desired. In practice, potentiometers 29, 35, 38 and 42 are preferably spaced somewhat from elements 12-15 inclusive so that the slight heating effect from the potentiometer resistors will have no adverse effect on the humidity conditions adjacent the elements. Thus, in a grain sample box, these resistors would be preferably located in a false bottom or the like.

Indicator panel or box 11 is supplied with current from a pair of alternating current line wires 44 which are connected to the primary winding of a constant voltage transformer 45, the secondary winding of this transformer being connected to leads 46 and 47. The resistors of potentiometers 48 and 49 are connected in series across leads 46 and 47 with their respective wipers being connected to contact points 51 and 52 of a single pole double throw switch 53, switch blade 54 of the switch being connected by wire 55 to detachable connection 32. Detachable connector 31 is directly connected to lead 47 by wire 56.

The indicating device of 11 is preferably a suitable microammeter or the like 58 and is of the direct current type principally because of the availability, lower cost, dependability and other favorable characteristics of this type of instrument. Microammeter 58 is connected across the output terminals 59 and 60 of a full wave electronic rectifier generally identified by the numeral 61 and comprising a pair of dual triode discharge devices. The discharge devices are connected in a rectifier bridge circuit in a conventional manner with the exception that a bias circuit is provided for each triode comprising a voltage source and a resistor connected between the cathode and control element of each of the triodes. Thus, the bias circuit for triode 62 comprises secondary winding 63 of transformer 57, and resistor 64 connected in series between the cathode and the control element of the triode. The bias circuit for triode 61 is the same as just described with the exception that secondary winding 66 is oppositely phased compared to winding 63. In the bias circuit for triode 67 secondary winding 68 is phased the same as 66 and secondary winding 69 in the bias circuit of triode 70 is phased the same as 63. With a bias circuit applied to each of the triodes, the null current flow through these devices, which are used as rectifiers, is minimized and the relatively small signal current impressed on the input terminals of the rectifier circuit can be more accurately determined than in previous circuits of such nature. The null current flow may be defined as that appearing at the output terminals of the rectifier circuit when there is no input current. As previously mentioned, windings 63, 66, 68 and 69 are all part of transformer 57, the primary winding 71 of which is connected across leads 46 and 47 from constant voltage transformer 45, the windings in the rectifier circuit normally being located as shown in the dotted lines. In addition, secondary winding 72 is provided in transformer 57 for energizing the heaters of the four triodes.

Lead 47 is connected to input terminal 73 of the rectifier network and the other input terminal 74 is connected to switch blade 75 by wire 76. Switch blade 75 is arranged to make contact with stationary contacts 77, 78, 79, and 80 which are connected to detachable connectors 41, 37, 34, and 28, respectively. In addition, a group of contacts 81 are connected in parallel with each of the above stationary contacts and are placed close enough together to permit blade 75 to make contact with all four at one time to thereby, in effect, make possible the shorting of contacts 77—80. A further stationary contact 82 is provided which is connected through resistor 83 to switch blade 53. Resistor 83 has a resistance value somewhat greater than a resistor such as 22 so that, when switch blade 75 is on 82, a predetermined reading may be had for calibration purposes.

It was previously mentioned that where manufacturing tolerances are close enough or the control tolerances are not too stringent, resistors 22, 23, 24 and 25 need not be adjustable and a common voltage supply is adequate. Under these conditions, an assembly of elements such as shown in Figures 4 and 5 is very convenient. In Figure 4, elements 12, 13, 14 and 15 are stacked in spaced relation along a pair of conductor members 85 and 86, the spacers 87 used along conductor 85 all being metallic and making contact with the eyelet connectors of each of the elements so that these eyelet connectors are all connected together and are connected to conductor 85. While the spacers along conductor 86 maintain the elements generally parallel, they are considerably different in detail. First, conductor 86 is insulated from the eyelets by insulating washers such as 88 and insulating sleeves 89 but electrical contact is made between conductor 86 and an eyelet of an element through a metallic washer 91 which is in electrical conductive relation with conductor 86 and an interposed carbon or similar resistor 92 which extends between the metallic washer 91 and the eyelet of an adjacent element. As best shown in Figure 5, the insulating sleeves 89 prevent electrical contact between sleeve 92 and conductor 86. Obviously, in accordance with the invention above discussed, resistor 92 is arranged to have a resistance value as near that of its respective humidity responsive element as reasonably possible. With this arrangement, conductor 86 is connected electrically with conductor 85 through four parallel paths in which each path includes a resistor 92 and a respective element. Obviously, if difficulty be experienced in obtaining resistors 92 of sufficiently high value, the arrangement shown in Figure 5 may be used for both conductors of Figure 4 with the total resistance value desired being suitably distributed between the resistors for each element.

Operation

With the apparatus set up as shown in Figure 1, and assuming that resistor 83 has a resistance value slightly greater than a resistor such as 22, and with switch blades 54 and 75 in the positions shown, the wiper of potentiometer 49 is adjusted to give a predetermined reading, such as full scale, on the indicator 58. Next, with button 84 pushed in to complete the shunt circuits around the elements, switch blade 75 is adjusted to engage contact 80 and potentiometer 29 is adjusted to give the same full scale reading on indicator 58 obtained when resistor 83 was in the circuit. Following this, blade 75 is moved to contact 79 and potentiometer 35 is similarly adjusted. Potentiometer 38 and 42 are also adjusted similarly as blade 75 is moved to contacts 78 and 77. With the voltages across the elements thus being properly adjusted, blade 75 is moved back to engage contacts 81 and blade 54 is operated to engage contact 51, the elements thus being connected in parallel and a reduced voltage being applied. This reduced voltage is then adjusted by potentiometer 48 to obtain, preferably, the same predetermined full scale reading on indicator 58. Button 84 is now released to open the shunt circuits around the elements and thereby make the apparatus ready for use.

For a better understanding of the apparatus as now set up, in Figure 2, curves 94, 95, 96 and 97 show the relation between the current output and relative humidity of a typical group of elements, curve 94, for instance, applying to element 12, curve 95 applying to element 13, curve 96 being representative of element 14 and curve 97 representing element 15. As will be apparent from these curves, the same reading on 58 may indicate any one of four relative humidities depending on which element is connected in the circuit. Because of this, a single scale may be used with a table for conversion depending on which element is connected or four scales may be used with one scale being calibrated for each of the elements. When all of the elements are connected together, a curve such as shown by the composite of curves 94, 95', 96' and 97' will result if adequate voltage be applied to the assembly and assuming that the elements are properly related in the circuit, such as results from the above mentioned calibration steps. However, because the composite arrangement offers less resistance than a single pair of matched impedances, the voltage is reduced when all of the elements are in parallel by shifting switch 54 to contact 51 as previously explained. By doing this, the voltage input is reduced so that the current output from the circuit will stay in the same general range as before so that a fifth scale of the same extent as the others may be used on the instrument to indicate the composite reading. Due to reducing the input voltage, the output current will then tend to follow along the line indicated by the numeral 98, it being recognized that the variation will not be a straight line as shown by 98 but will be slightly irregular as suggested by the composite of curves 94, 95', 96' and 97'.

With the apparatus ready for use, grain or the like may be put in box 10, the box then being closed tight and let stand for a sufficient period for the moisture content of the air enclosed to come to equilibrium, at which time a reading is taken. With switch blade 75 on 81 and blade 54 on 51, the reading may be anywhere within the full range of the apparatus. If a more exact reading is then desired blade 75 is moved to connect the individual element intended for operation in the range indicated by the reading obtained and blade 54 is moved to contact 52. The reading then obtained is the most accurate that can be obtained by this apparatus. As a practical matter, it is preferable that several boxes such as 10 be provided so that some can be stabilizing while readings are being taken on another. If the apparatus is used to respond to relative humidity in an air conditioning system, a suitable relay may be substituted for indicator 58 and the apparatus then used for control purposes.

With a group of elements such as described connected in parallel and responding to relative humidities over a 40–80% range, for example, it is obvious that when the humidity involved is near the 40% end of the range, only the element 12, the one having the most salt in its solution, will be really effective in varying the impedance of the circuit as a whole for the atmosphere being sensed will tend to be too dry for the other elements and their resistance will then be very high. When the humidity being sensed is near the high end of the range, the elements having the greater salt concentrations, the ones usable for the lower percentages of humidity, will be nearly short circuited, in effect, but the resistance values of the pairs of matched impedances cannot drop below that of their respective fixed resistors and the major resistance variation in the circuit will be due to the element having the least salt in its coating, such as element 15, thus, the resistance for the parallel circuit as a whole will vary from approximately the resistance of the impedances 12 and 22, assuming that element 12 is working at the dry end of the range, and a resistance due to parallel addition of impedances 15 and 25 plus approximately 300,000 ohms for each of the matched impedances 12 and 22, 13 and 23 and 14 and 24, this resistance value obtained by the parallel addition being, of course, considerably lower than that of any of the pairs of impedances by itself. Further, with a substantially constant voltage across the elements and with the resistance of the indicator circuit being relatively low and fixed, the present apparatus gives a more linear and accurate response than that previously known.

As many substitutions and equivalents will become apparent upon a study of the preceding specification and drawings, the scope of the present invention is to be determined only by the appended claims.

I claim as my invention:

1. A condition responsive apparatus comprising a current measuring means; a source of current; and electric circuit means connected to said source and said measuring means, said circuit means including a plurality of condition responsive impedance elements each having a relatively high ratio of impedance change to changes of the condition and having a relatively high range of impedance values under normal operating conditions and having a predetermined impedance value at about the midpoint of said range, a plurality of impedance means having a negligible response to said condition and each having an impedance value substantially the same as the predetermined value of a corresponding element, each of said impedance means being connected in series with an element to form a plurality of series connected matched impedances, and conductor means connecting said series connected matched impedances in parallel with each other and in series with said source and said measuring means.

2. Apparatus such as defined by claim 1 wherein the conductor means connecting said series connected matched impedances in parallel includes switch means and wherein other connections are provided and are controlled by said switch means in a manner to connect each of said series of matched impedances individually in series with said source of current and said measuring means, and means for changing the voltage of said current source to one of two values depending upon whether a single series of matched impedances is being used or the plurality of series connected matched impedances are being used in parallel.

3. In condition responsive apparatus, condition responsive resistance means having a high coefficient of resistance and having predetermined high resistance values when responding to conditions within its normal operating range, second resistance means having a negligible response to said condition and having a resistance value matching that of said condition responsive element when said element is at about the midpoint of said normal range, a source of alternating current, a full wave electronic rectifier network circuit comprising a plurality of triode discharge devices, a source of electrical potential connected in bias relation to each of said devices for minimizing reverse current flow, means connecting said rectier circuit, said current source, said element and said resistor in series, and means responsive to the output of said rectifier circuit.

4. In an electrical circuit, a plurality of moisture responsive elements each having a predetermined relatively high resistance value when at the midpoint of its normal operating range and each element having a different range, a fixed resistor connected in series with each moisture responsive element, each fixed resistor having a resistance value substantially corresponding to the predetermined resistance value of its respective moisture responsive element, conductor means connecting the series connected elements and resistors in parallel, and means responsive to the resultant resistance between said conductors.

5. In a moisture measuring apparatus, a plurality of moisture responsive resistance elements each having a predetermined relatively high resistance value when at the midpoint of its normal operating range and each element having a different range, a fixed resistor connected in series with each moisture responsive element, each fixed resistor having a resistance value substantially corresponding to the predetermined resistance value of its respective moisture responsive element, conductor means connecting series connected elements and resistors in parallel, means for imposing an electrical potential across the conductors, and means responsive to the current flow through said connected resistors and elements.

6. In a moisture measuring apparatus, a plurality of moisture responsive resistance elements each having a predetermined relatively high resistance value when at the midpoint of its normal operating range and each element having a different range, a fixed resistor connected in series with each moisture responsive element, each fixed resistor having a resistance value substantially corresponding to the predetermined resistance value of its respective moisture responsive element, conductor means connecting the series connected elements and resistors in parallel, a rectifier network having input connections and output connections, means connecting said conductors and said input connections in series, and means responsive to the electrical output of said rectifier network connected to the output connections of said network.

7. Apparatus such as defined by claim 1 wherein each of said elements comprises a pair of spaced hollow connector means and wherein one of said conductors is connected to one of the pair of connectors of each element by an individual tubular fixed resistor, the elements and fixed resistors being arranged in stacked relation along the two conductors.

8. In humidity responsive apparatus, a pair of conductors, a plurality of humidity responsive resistance elements each having spaced electrical connection eyelets arranged in spaced stacked relation along said conductors with said conductors extending through the eyelets of the elements, insulation means between one of the conductors and the set of eyelets on that conductor, spacers formed of electrical resistor material arranged along said one conductor and between said elements with said spacers each contacting one of said eyelets, insulation between the other end of each of said spacers and the adjacent spaced eyelet, and conductive washer means arranged between said one conductor and the insulation at the other end of each of said spacers.

9. In a moisture responsive apparatus, a plurality of moisture responsive resistance elements, each normally operating in a different moisture range than the other elements, each of said elements having closely similar resistance values when at the midpoint of its respective moisture responsive range, a resistor having a relatively fixed resistance value substantially matching that of an element at said midpoint of its range connected in series with each element to form a plurality of pairs of matched resistors, a source of current for said apparatus, current indicating means, and circuit means connecting said plurality of pairs of matched resistors in parallel with one another, and in series with said indicating means.

10. In a moisture responsive apparatus, a plurality of moisture responsive elements each normally operative in a different moisture range than the other elements, each of said elements having closely similar resistance values when at the midpoint of its respective moisture responsive range, a resistor having a relatively fixed resistance value substantially matching that of an element at said midpoint of its range connected in series with each element to form a plurality of pairs of matched resistors, a source of current for said apparatus, a full wave rectifier having input connections and output connections, current indicating means connected to the output connections of said rectifier, and circuit means connecting said plurality of pairs of resistors in parallel with one another, and in series with the input of said rectifier.

11. In a moisture responsive apparatus, a plurality of moisture responsive elements each normally operative in a different moisture range than the other elements, each of said elements having closely similar resistance values when at the midpoint of its respective moisture responsive range, a resistor having a relatively fixed resistance value substantially matching that of an element at said midpoint of its range connected in series with each element to form a plurality of pairs of matched resistors, a source of current for said apparatus, a full wave electronic rectifier having input and output connections, said rectifier comprising a plurality of triode discharge devices, each of said triodes having a bias circuit connected between its control element and its cathode, said bias circuit including a source of alternating current, indicating means connected to the output connections of said rectifier, and circuit means capable of connecting said pairs of resistors in parallel with each other and in series with the input connections of said rectifier.

12. In a moisture responsive apparatus, a plurality of moisture responsive elements each normally operative in a different moisture range than the other elements, each of said elements having closely similar resistance values when at the midpoint of its respective moisture responsive range, a resistor having a relatively fixed resistance value substantially matching that of an element at said midpoint of its range connected in series with each element to form a plurality of pairs of matched resistors, a source of alternating current for said apparatus, a full wave electronic rectifier having input and output connections, said rectifier comprising a plurality of triode discharge devices, a transformer having a plurality of secondary windings and a primary winding connected to said source of alternating current, a biasing circuit for each of said triodes comprising one of said secondary windings connected between the cathode and the control element of the triode, direct current indicating means connected to the output of said rectifier and circuit means for connecting said pairs of matched resistors in parallel with each other and in series with the input connections of said rectifier.

References Cited in the file of this patent

UNITED STATES PATENTS

| Number | Name | Date |
|---|---|---|
| 2,285,421 | Dunmore | June 9, 1942 |
| 2,329,073 | Mitchell et al. | Sept. 7, 1943 |
| 2,543,384 | Squier | Feb. 27, 1951 |

OTHER REFERENCES

Article in Journal of Research, Nat. Bur. of Standards, vol. 23, No. 6, December 1939, pp. 701–714.